(12) United States Patent
Wang et al.

(10) Patent No.: US 10,848,741 B2
(45) Date of Patent: Nov. 24, 2020

(54) RE-CINEMATOGRAPHY FOR SPHERICAL VIDEO

(71) Applicant: Adobe Inc., San Jose, CA (US)

(72) Inventors: Oliver Wang, Seattle, WA (US); Chengzhou Tang, Burnaby (CA)

(73) Assignee: Adobe Inc., San Jose, CA (US)

( * ) Notice: Subject to any disclaimer, the term of this patent is extended or adjusted under 35 U.S.C. 154(b) by 514 days.

(21) Appl. No.: 15/619,702

(22) Filed: Jun. 12, 2017

(65) Prior Publication Data
US 2018/0359414 A1 Dec. 13, 2018

(51) Int. Cl.
| | |
|---|---|
| *H04N 13/243* | (2018.01) |
| *G06T 7/246* | (2017.01) |
| *H04N 5/232* | (2006.01) |
| *G06T 7/269* | (2017.01) |
| *H04N 13/204* | (2018.01) |
| *G06T 7/20* | (2017.01) |
| *G06T 7/579* | (2017.01) |

(52) U.S. Cl.
CPC ............ *H04N 13/243* (2018.05); *G06T 7/20* (2013.01); *G06T 7/246* (2017.01); *G06T 7/269* (2017.01); *G06T 7/579* (2017.01); *H04N 5/23254* (2013.01); *H04N 5/23267* (2013.01); *H04N 13/204* (2018.05); *G06T 2200/32* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 8,199,207 B2 | 6/2012 | Kato | |
| 9,648,303 B1* | 5/2017 | Resch | G06T 7/246 |
| 2006/0061583 A1* | 3/2006 | Spooner | G06T 15/20 |
| | | | 345/582 |
| 2006/0061661 A1* | 3/2006 | Grindstaff | G06T 3/0006 |
| | | | 348/208.99 |
| 2010/0045665 A1* | 2/2010 | Lefevre | G06T 7/20 |
| | | | 345/419 |

(Continued)

OTHER PUBLICATIONS

Johannes Kopf, "360° Video Stabilization", ACM Trans. Graph., Nov. 2016, 9 pages, vol. 35, No. 6, Article 195.

(Continued)

*Primary Examiner* — Ricky Chin
(74) *Attorney, Agent, or Firm* — Finch & Maloney PLLC

(57) ABSTRACT

A technique for modifying digital video includes receiving a plurality of digital video frames recorded by a camera. Each frame has a spherical field of view and a viewing angle associated therewith, where the viewing angle is with respect to a fixed reference frame. A motion of the camera relative to the fixed reference frame is calculated across at least some of the digital video frames. The viewing angle associated with each digital video frame is reoriented during post-processing of the digital video frames based at least in part on the calculated motion of the camera and at least one constraint to produce a digitally modified video such the viewing angle associated with at least one of the reoriented digital video frames is different than the viewing angle associated with the same digital video frame before reorientation.

20 Claims, 6 Drawing Sheets

(56) References Cited

U.S. PATENT DOCUMENTS

| | | | | |
|---|---|---|---|---|
| 2010/0260486 | A1* | 10/2010 | Liu | H04N 19/597 |
| | | | | 386/341 |
| 2013/0077880 | A1* | 3/2013 | Venkataraman | H04N 13/128 |
| | | | | 382/232 |
| 2014/0003705 | A1* | 1/2014 | Taguchi | G06T 7/344 |
| | | | | 382/154 |
| 2014/0126769 | A1* | 5/2014 | Reitmayr | G06T 7/73 |
| | | | | 382/103 |
| 2015/0138185 | A1* | 5/2015 | Huang | G06T 17/00 |
| | | | | 345/419 |
| 2016/0150222 | A1* | 5/2016 | Luo | G06T 15/20 |
| | | | | 348/43 |
| 2017/0142337 | A1* | 5/2017 | Kokaram | H04N 5/23238 |
| 2017/0213320 | A1* | 7/2017 | Yucer | G06T 7/579 |
| 2018/0234669 | A1* | 8/2018 | Chen | H04N 5/23238 |
| 2018/0249144 | A1* | 8/2018 | Feng | G06T 7/579 |
| 2018/0332267 | A1* | 11/2018 | Hesla | H04N 5/9201 |

OTHER PUBLICATIONS

Yu-Chuan Su et al., "Pano2Vid: Automatic Cinematography for Watching 360° Videos", The University of Texas, Mar. 1, 2017, 16 pages.
Michael L. Gleicher et al., "Re-Cinematography: Improving the Camerawork of Casual Video", ACM Transactions on Multimedia Computing, Communications and Applications, Oct. 2008, 28 pages, vol. 5, No. 1, Article 2.

* cited by examiner

RE-CINEMATOGRAPHY FOR SPHERICAL VIDEO

FIELD OF THE DISCLOSURE

This disclosure relates generally to digital image processing, and more particularly, to techniques for digitally modifying a spherical video.

BACKGROUND

Three hundred and sixty degree (360 degree) video provides an immersive experience for viewers, allowing them to freely explore an environment by simply changing the viewing angle using a virtual reality (VR) headset or other suitable device. However, creating high-quality video content can be challenging, as viewers may miss important events when looking in a different direction, or they may see things that detract from the experience, such as stitching artifacts or the film crew. Furthermore, generally the viewer does not look in all possible directions equally. Rather, viewers of 360 degree video are likely to spend more time viewing content located at or near true north, which describes video content that is directly in front of the viewer, rather than viewing content that is to the side of, above, below, or behind the viewer.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Overview

Figure 1:
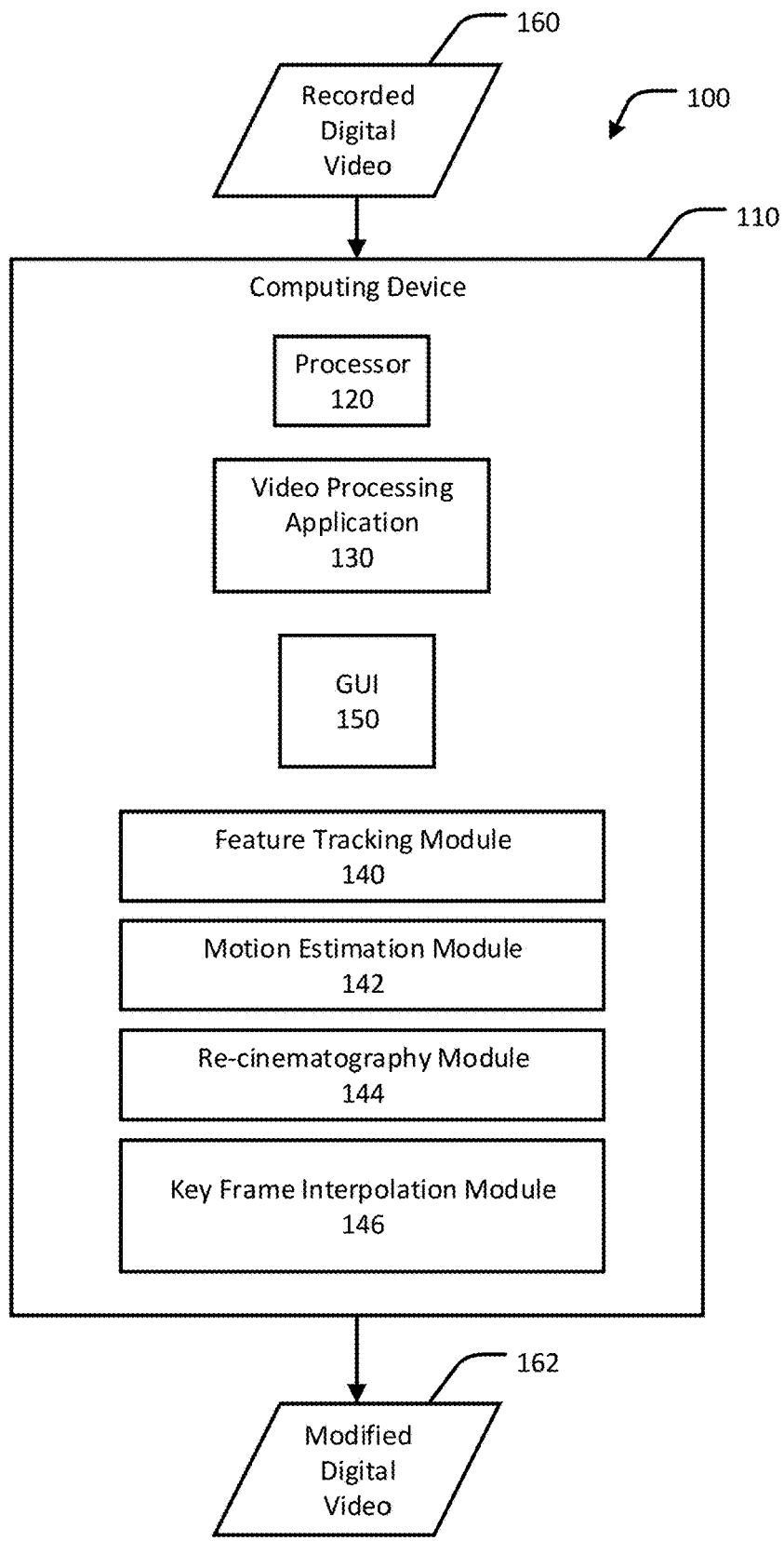
FIG. 1 shows an example system for digitally modifying a video, in accordance with an embodiment of the present disclosure.

Spherical video, which includes 360 degree and other wide-angle video that has less than a complete 360 degree field of view, can be captured by both consumer handheld cameras and professional camera array systems. Virtual reality (VR) headsets are popular for viewing 360 degree videos, which provide a wider field of view than conventional video. However, the wide field of view also introduces a number of challenges for content creators and viewers. For example, as mentioned above, viewers can miss important events while looking away from them, or they can see things that are not intended to be seen, such as stitching artifacts or the camera crew. In some circumstances, fast rotations of the camera or camera shake during recording of the 360 degree video can disorient the viewer, potentially causing distraction, confusion or nausea. Path planning in traditional, non-spherical video is a technique where the viewing angle is modified to change the perspective. However, path planning has the disadvantage of distorting or cropping off certain content to fit the remaining content into a different aspect ratio other than originally intended, and therefore can produce undesirable results when used to modify spherical video.

To address these issues, professional video producers may employ steady-cams, gimbals, cranes, dollies, and other technically sophisticated rigs to stabilize the camera during recording. However, casual videographers may find that such hardware is too expensive or otherwise impractical for their desired purposes. In such cases, the appeal and quality of the video can be improved during post-processing to generate a pleasant and artistically designed viewing experience. For instance, software can be used for video stabilization during post-processing as an alternative or in addition to certain hardware solutions. Moreover, stable camera motion alone is not always sufficient to enable a pleasant viewing experience if the camera motion and direction are not creatively interesting. Thus, in addition to image stabilization, software can be used to artistically modify digital video in post-processing, such as by changing the primary viewing angle of a spherical video to focus on interesting features in the scene.

To this end, and in accordance with an embodiment of the present disclosure, techniques for digitally modifying a spherical video are provided as part of a post-production approach for creating appealing content and addressing limitations of existing solutions. In general, re-cinematography of 360 degree video includes removing undesirable camera motions, such as shake and rapid rotations, while enforcing artistic constraints, such as cinematographic pans and primary viewing angle. There are several ways to define and add such constraints on the resulting 360 degree video, including via a VR interface that records the viewing direction of an editor viewing the original, unmodified video. A uniform framework for 360 degree and wide-angle video, such as described in this disclosure, enables virtual cinema viewing in VR for a large library of existing footage. The disclosed techniques are particularly useful in situations where a seamless experience for viewing 360 degree video can encourage editors to modify videos to highlight regions of interest, and afford such editors new degrees of creative freedom.

In more detail, a technique for modifying digital video includes receiving a plurality of digital video frames recorded by a camera or generated by a computer. Each frame has a spherical field of view (that is, a field of view of 360 degrees or less) and a viewing angle associated with the field of view. The viewing angle is defined with respect to a fixed reference frame, such as a reference frame fixed to a point in the scene. A motion of the camera, or of a primary viewpoint of a computer-generated video, relative to the fixed reference frame is calculated across at least some of the digital video frames. The viewing angle associated with each digital video frame is reoriented based at least in part on the calculated motion of the camera and at least one optimization constraint to produce a digitally modified video. The reoriented viewing angle associated with at least one of the reoriented digital video frames in the digitally modified video is different than the viewing angle associated with the same digital video frame before reorientation. The constraints include artistic cinematography constraints, smoothness constraints, or both, which are used to provide a degree of user control over the reoriented viewing angle while also reducing or eliminating undesirable rapid or uneven changes in the viewing angle over a sequence of video frames.

To achieve the desired results, the artistic cinematography constraints are applied during post-processing of the digital video frames to help keep desirable content in the viewable space near true north, while undesirable content is located behind the user or otherwise outside of the user's predominant field of view. The artistic constraints are jointly optimized with the smoothness constraints to reduce or otherwise limit camera shake and rapid rotations, such as those caused by hand held cameras or motorized gimbals. An editor can utilize the disclosed techniques to define both desirable and undesirable regions in the video, as well as to control the rate of change and extent to which the re-cinematography alters the viewing angle. In some cases, the cinematography and smoothness constraints are combined with automatic constraints such as saliency maps or stitching regions for known camera configurations, if present. Other user-specified constraints are added by directly drawing boundaries or focus points on an equirectangular projection of the 360 degree video. Alternately or additionally, the editor can view the content in a VR headset as a guide, and the viewing angle path of the VR headset is recorded and used as a constraint in the optimization.

Some embodiments of the present disclosure provide techniques that smooth the camera path (that is, smooth changes in the rate at which the viewing angle of the 360 degree video changes to reduce or eliminate shakiness or abrupt changes) while incorporating the editor's constraints. In this manner, amateur users as well as professionals can produce cinematographically pleasing results regardless of whether the video as recorded is static, smooth, or shaky.

Some embodiments of the present disclosure provide techniques that can be applied to non-360 degree video. There is presently a relatively limited library of existing 360 degree video content when compared to traditional video. However, videos recorded on wide-angle head mounted cameras are well suited to viewing in a VR headset, as the cameras are often worn on the user's head to provide a first-person perspective of what the user sees. Some wide-angle head mounted cameras provide approximately a 150 degree horizontal field of view (FoV), while some viewing devices provide about a 90 FoV, all of which are wider than a person's predominant field of view. The disclosed techniques can also be used for post-processing wide-angle, non-360 degree videos created by and for such devices.

The term re-cinematography, as used in this disclosure, generally refers to post-processing techniques for editing or otherwise modifying recorded images and video. Re-cinematography includes processes where video is improved or otherwise altered by integrating content-driven optimization constraints and camera motion stabilization. Re-cinematography can be extended to spherical video, which benefits from many or all possible viewing angles being recorded during filming, so cropping is not necessary, freeing these techniques from the trade-off between guiding the viewer's attention and preserving video content. While it is possible for a viewer to look in any direction of a spherical video using a VR headset, people tend to predominantly view content in a narrow range around a true north, or forward facing, direction due to factors such as being seated, comfort, and the proclivity to face forward. While the human field of view is substantially wider, most of the attention is focused in a very narrow central range near and around true north. Re-cinematography can reorient the primary viewing angle of the video such that points of interest in the scene are located in the central range of vision while the viewer is looking in a true north or otherwise face forward direction (in other words, directly in front of the viewer so that the viewer does not need to change the viewing angle to see the points of interest). Spherical video is particularly well suited to re-cinematography because many or all possible viewing angles are recorded at the same time, which allows for significant control over the perceived true north direction in video post-processing and during playback.

Video Stabilization and Re-Cinematography

Re-cinematography is an extension of video stabilization. Video stabilization is an approach for improving the camera motion in a video by reducing or eliminating shakiness and other undesirable movements. Some common ways to stabilize video involve tracking features in the scene over a period of time and computing an image warp sequence that smoothes feature trajectories and thus the apparent motion of the video. In some situations, stabilization is achieved by applying a sequence of homographies (isomorphism of projective spaces) or other 2D transformations that compensate for motion to the video. In some cases, a grid of homographies is used for robustness by using projective reconstruction on a low dimensional feature subspace or by fitting smooth cropping windows that minimize first and second order motion. In some other cases, a full three-dimensional (3D) reconstruction of the scene is built. The 3D reconstruction can then be used to synthesize a smooth virtual camera trajectory.

An extension of video stabilization to 360 degree videos includes computing a 3D geometric relationship between key frames via a 5-point algorithm (a technique for estimating camera motion between two calibrated views from five points), and smoothly interpolating key frames using a deformable model. Key frames are image or video frames that define the starting and ending points of a transition between the frames. According to an embodiment of the present disclosure, a technique is disclosed for estimating rotation and translation on a sphere that is more robust than the 5-point algorithm. In one case, a total stabilization (where fixed scene points will remain stationary throughout the video) is computed, while in another case, artistic and smoothness constraints are used to produce a cinematographically pleasing 360 degree video, where the camera motion is directed by an editor.

VR viewing becomes a more enjoyable experience when important objects in a 360 degree or wide-angle video are rotated into view in front of a viewer without requiring the viewer to change the viewing angle. This may, in some circumstances, reduce control of the viewer to freely explore the space in the video, as some rotations will be out of the control of the viewer. However, traditional wide angle video began with static shots before filmmakers learned how to use camera motion as an artistic tool without disorienting the viewer. According to embodiments of the present disclosure, techniques for reorienting the viewing angle of a digital video can be applied to 360 degree and wide-angle video. Thus, it is possible to separate the viewer's real world head motion from the perceived motion in the VR space to map virtual spaces into physical constraints, such as room sizes, without causing confusion.

System Architecture

FIG. 1 shows an example system 100 for digitally modifying a video, in accordance with an embodiment of the present disclosure. The system 100 includes a computing device 110 having a processor 120, a video processing application 130, and a graphical user interface (GUI) 150. The GUI 150 may include or be extended to include a VR headset. The computing device 110 is configured to execute a feature tracking module 140, a motion estimation module 142, a re-cinematography module 144, and a key frame interpolation module 146. The computing device 110 is further configured to receive, as an input, a digital video 160. The digital video 160 may be recorded, for example, by a physical camera or created electronically using digital art-generating techniques. In any event, the digital video 160 includes a plurality of video frames that when played back in sequence produce moving images. The images may include one or more features, such as objects, graphics, and the like, the position of which can be tracked from one video frame to another to calculate a trajectory of the feature. The computing device 110 is further configured to produce, as an output, a modified digital video 162 that is based at least in part on the recorded digital video 160. The modifications depend on several things, including the tracked features of the recorded digital video 160 and any user-supplied constraints that are applied to the processing of the recorded digital video 160, such as variously described in this disclosure.

As described in further detail below with respect to, for example, FIGS. 2 and 3A-3C, the video processing application 130 is generally configured to perform one or more of the following functions: feature tracking, motion estimation, re-cinematography using motion estimation and one or more constraints, and key frame interpolation. In some embodiments, the feature tracking module 140 is generally configured to track a trajectory of one or more features in a sequence of video frames. A feature may, for example, include any object appearing in multiple video frames, and the trajectory may represent the change in position of the feature across the video frames (for instance, as the feature appears to move from one side of the video frame to another). While in some embodiments feature tracking is performed on many or all video frames in the sequence, in some other embodiments feature tracking is performed on a select number of video frames, which are also referred to as key frames.

In some embodiments, the motion estimation module 142 is generally configured to calculate the motion of the camera or, in the case of computer-generated content, the primary viewpoint, across the video frames. The motion is determined based at least in part on the trajectory or trajectories of the tracked feature or features, as determined by the feature tracking module 140.

In some embodiments, the re-cinematography module 144 is generally configured to modify at least some frames of the recorded digital video 160 to change the viewing angle from that of the original video 160 and to produce the modified digital video 162. In some embodiments, the re-cinematography module 144 modifies selected frames of the recorded digital video 160, such as one or more of the key frames. In such cases, the key frame interpolation module 146 is generally configured to interpolate the changed viewing angle of the key frames to other video frames located in sequence between the key frames, so as to produce a visually even and smooth transition between the key frames.

Re-Cinematography Methodology

Figure 2:
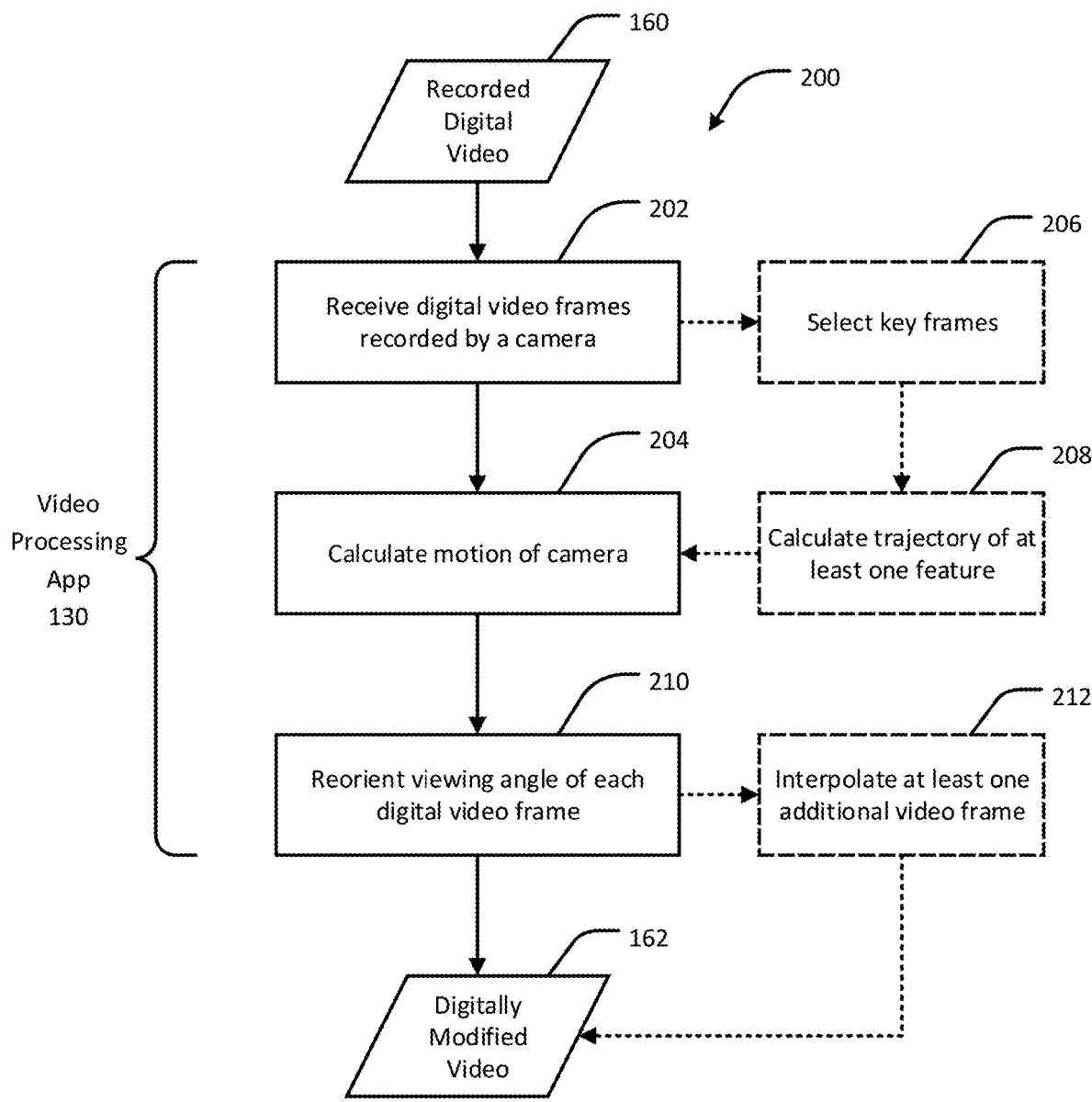
FIG. 2 shows an example methodology for digitally modifying a video, in accordance with an embodiment of the present disclosure.

FIG. 2 shows an example methodology 200 for digitally modifying a video, in accordance with an embodiment of the present disclosure. The methodology 200 may, for example, be implemented by the system 100 of FIG. 1. The methodology 200 includes receiving 202 digital video frames recorded by a camera 160 or computer-generated video. The existing motion of the camera between frames is calculated 204 using, for example, feature tracking and a pairwise rotation and motion estimation formulation for spherical video. The motion calculation 204 can be performed by the motion estimation module 142. In some embodiments, the motion of the camera is calculated 204 on selected 206 key frames using the calculated 208 trajectory of at least one feature in the selected frames, rather than on all frames. In some embodiments, the feature trajectory calculation 208 can be performed by the feature tracking module 140.

Referring still to FIG. 2, the methodology 200 further includes reorienting 210 the viewing angle such that the primary viewing angle for a given video frame is different than in the original, recorded digital video 160. The reorienting 210 is calculated using a joint optimization on at least some of the video frames (for example, each of the key frames). The optimization enforces smoothness in the video sequence while also conforming to a set of user-provided or automatic path planning constraints to limit the amount of change in the viewing angle from frame to frame. In some embodiments, the reorienting 210 can be performed by the re-cinematography module 144. In some embodiments, the motion between frames is smoothly interpolated 212 to produce the digitally modified video 162, which can be performed by the key frame interpolation module 146.

Figure 3A:
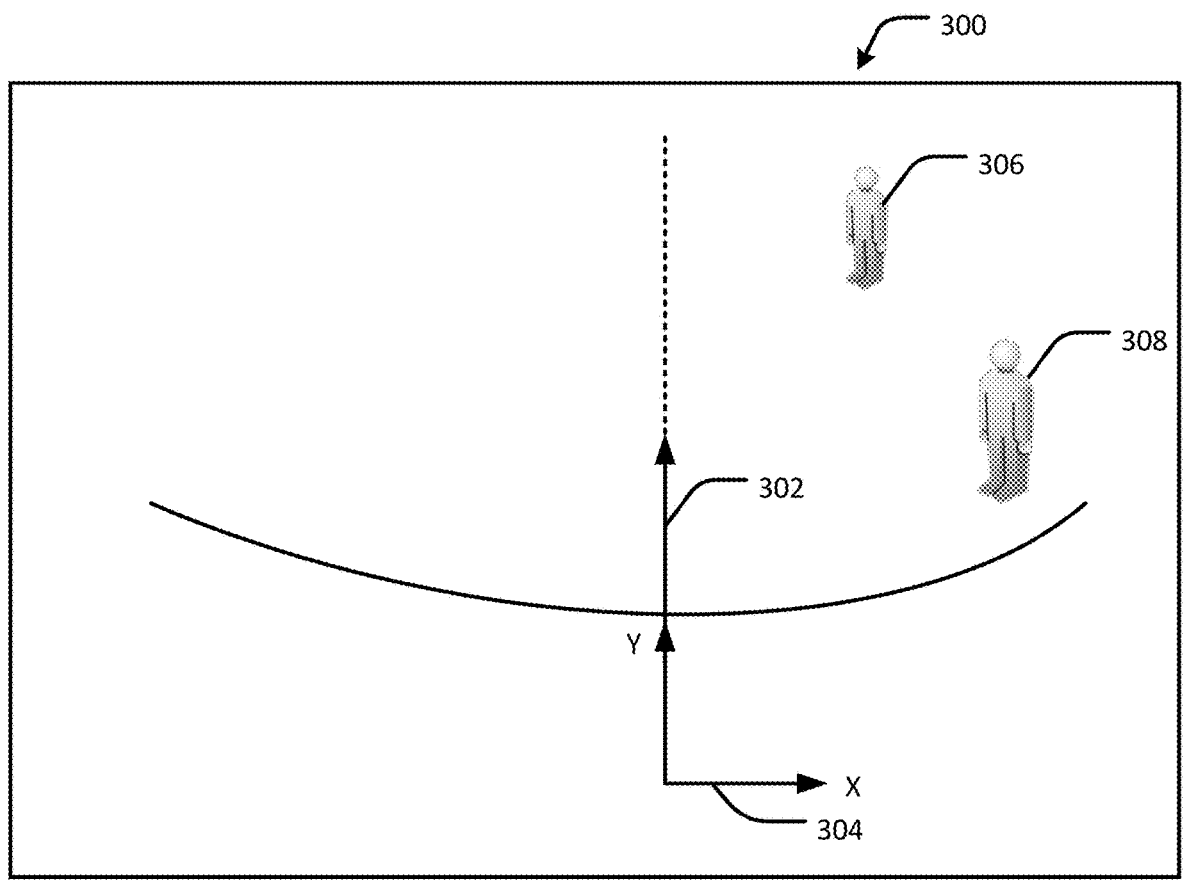
FIGS. 3A, 3B and 3C show several example scenes in a frame of a digital video, in accordance with embodiments of the present disclosure.
Figure 3B:
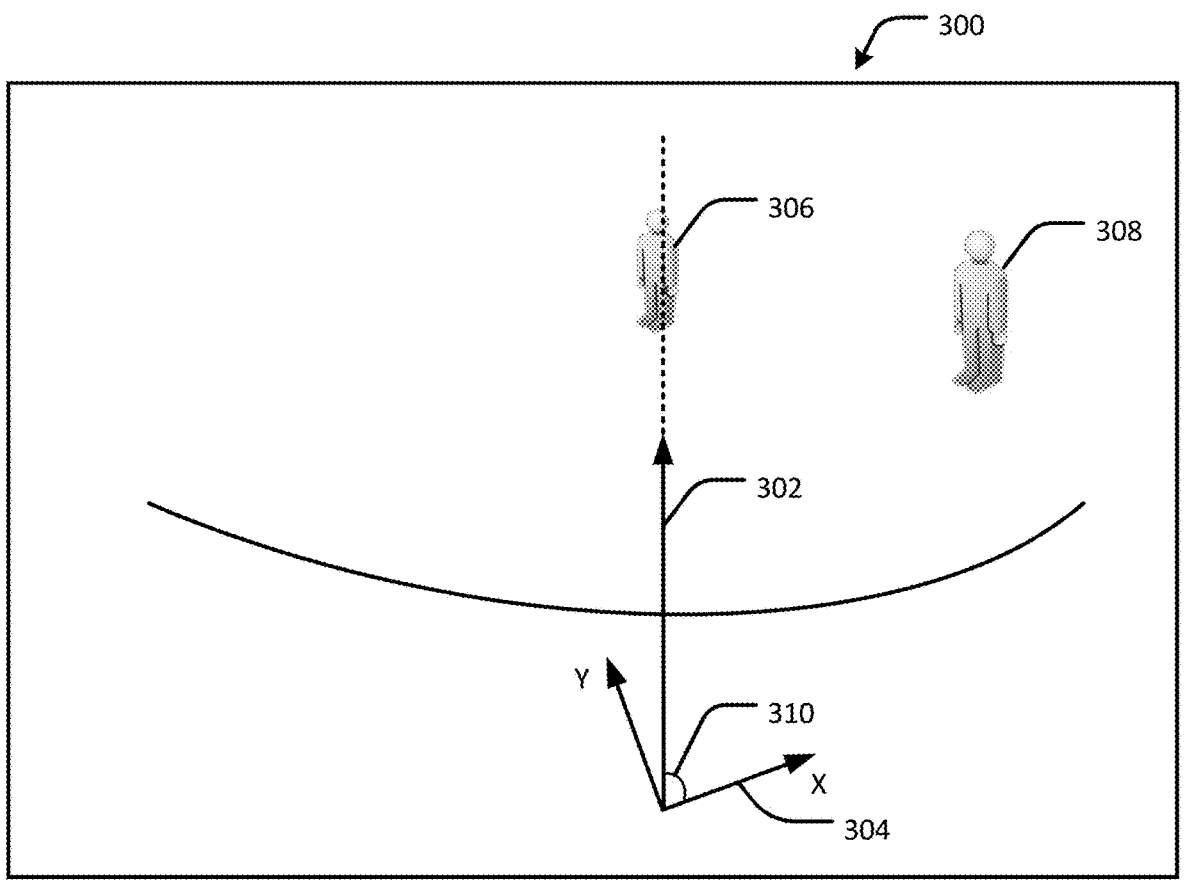
Figure 3C:
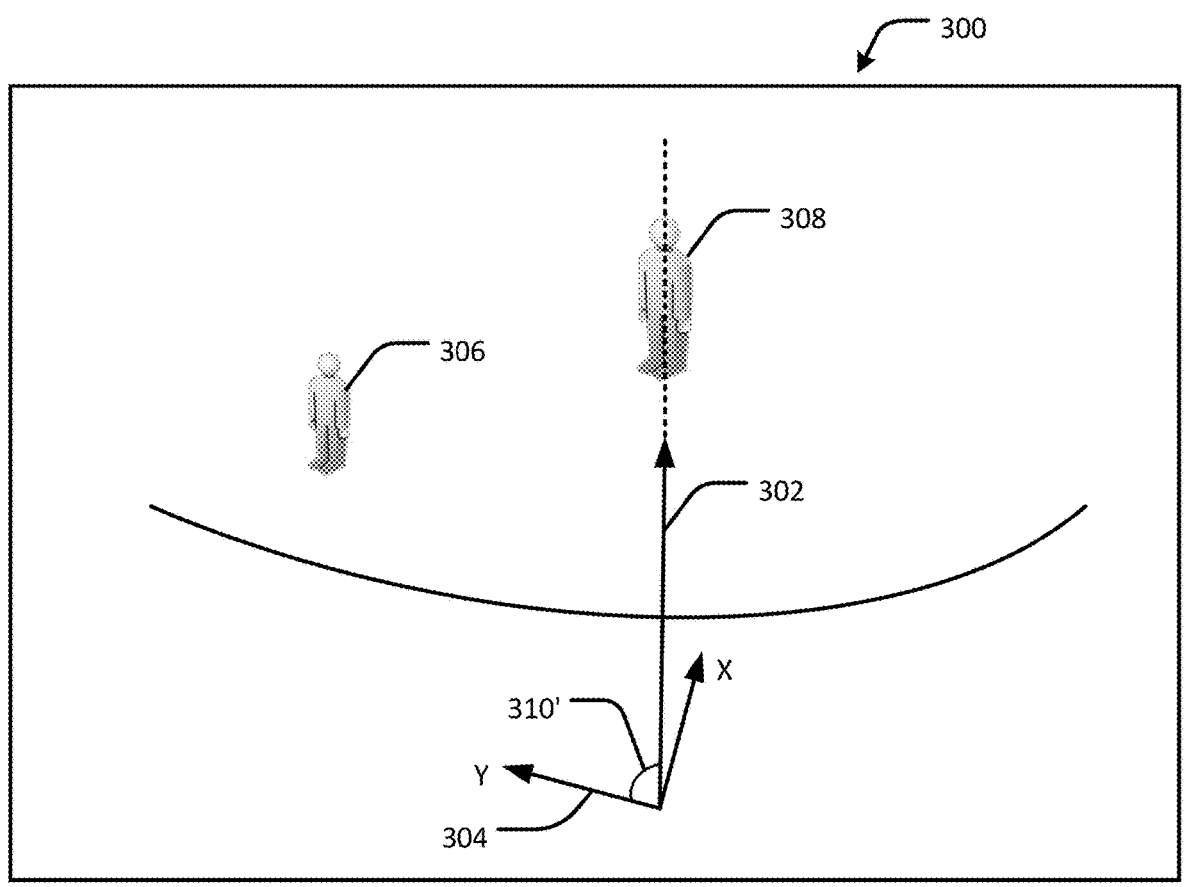

Referring now to FIGS. 3A, 3B and 3C, each frame 300 of the recorded digital video 160 has a primary viewing angle 302 with respect to a fixed reference frame 304 (for example, an x-y or x-y-z reference frame associated with the scene in the video). Although FIGS. 3A, 3B and 3C are depicted in only two dimensions for clarity, it will be understood that the disclosed principles also apply to three dimensional scenes such as commonly found in 360 degree videos. The primary viewing angle 302 is the direction the viewer faces within the scene while looking straight ahead (that is, not looking up, down or to the side). For example, in FIG. 3A, the frame 300 includes two objects 306 and 308 that are each located to the right of the primary viewing angle 302. In this example, the viewer may, optionally, turn his or her head to the right using a VR headset or similar mechanism to change the viewing direction such that either of the objects 306 and 308 appears in the center of the scene along the now adjusted primary viewing angle.

As noted with respect to the example of FIG. 3A, both of the objects 306 and 308 are located to the right of the primary viewing angle 302 and not directly ahead of the viewer. Although the viewer can look to the right (using, for example, a VR headset) to place either of the objects 306, 308 in the center of the viewable scene of the frame 300, according to some embodiments, an editor of the recorded digital video 160 may wish to modify the primary viewing angle 302 with respect to the fixed reference frame 304 such that a different point in the 360 degree or wide angle scene of the frame 300 is located directly in front of the viewer, without requiring the viewer to look in a different direction to center that particular point. For instance, in FIG. 3B, the viewing angle has been reoriented, according an embodiment of the present disclosure, such that object 306 is directly ahead of the viewer and aligned with the primary viewing angle 302, which is at an angle 310 with respect to the fixed reference frame 304. In this case, the viewing angle 302 has been reoriented without requiring the viewer to look to the right in the scene (in other words, the viewing angle 302 of the modified video is changed without any head movement of the viewer, so that the user is still looking straight ahead). Similarly in FIG. 3C, the viewing angle has been reoriented such that the object 308 is directly ahead of the viewer and aligned with the primary viewing angle 302, which is at an angle 310' with respect to the fixed reference frame 304. Other examples will be apparent in view of this disclosure.

The reoriented viewing angle is calculated as a function of camera motion (as determined, for example, by the trajectories of the objects in the scene over a series of video frames) and one or more user-supplied or automatic constraints. As will be described in further detail below, the constraints can include art direction constraints, where an editor determines which points in the 360 degree or wide angle scene should be directly in front of the viewer, and smoothness constraints, which determine the rate at which the primary viewing angle is changed over time during video playback (to minimize rapid or shaky transitions).

Feature Tracking

As discussed with respect to calculating 208 the trajectory of at least one feature and calculating 204 the motion of the camera in FIG. 2, in some embodiments, camera motion in a sequence of input video frames is estimated using feature tracking to ensure that the resulting trajectory of the output video is smooth (for example, by the feature tracking module 140 of FIG. 1). For 360 degree videos, the equirectangular image is mapped to a cube map and feature points are tracked independently on each cube face using Kanade-Lucas-Tomasi (KLT) feature tracking. For wide-angle videos, the image is undistorted using an ATAN (arctangent) camera distortion model with a single FoV parameter. Note that this is the only stage of the process that is different between 360 degree and wide-angle video. After this step both videos are projected onto a sphere (e.g., equirectangular) format.

Features are, in some instances, tracked on key frames, excluding some or all intermediate frames. A large number of features can be selected so that feature track spacing is roughly even. A sphere corresponding to the spherical (360 degree or wide angle) video frame is divided into a grid with, for example, 20×20 cells. Features in the video frame are randomly discarded from each grid cell until a certain threshold is reached. For example, the threshold may exclude feature points that are more than 2° away from any previously selected features. In addition, feature points are tracked in both forward and backwards directions within the series of key frames.

Rotation, Motion Estimation, and Key Frame Selection

After collecting the key frame-wise feature tracks, the relative rotation and translation of the feature points between key frames is estimated by calculating 208 the trajectory of the feature point or points (see FIG. 2). With calibrated cameras, a 5-point algorithm can be used to estimate the true rotation and the unit translation vector between two frames. However, for videos where precise camera calibration is unavailable, such as those captured from various cameras or downloaded from the Internet, the 5-point algorithm is sometimes unreliable. As an alternative, a novel camera motion estimation method is used that separates 3D rotation and 3D translation. By analyzing the motion of features projected onto a unit sphere, the rotation and translation of a camera displacement can be separated from each other. The flow of features caused by a rotation can be represented by field lines that move equally in parallel planes normal to the rotation axis independently of scene depth. Translation, on the other hand, causes feature points to move along field lines emerging from, and ending at, the intersection points between the sphere and the translation direction, and the amount of motion along these lines is a function of the depth of the point. Therefore, to estimate the rotation and translation, the motion between key frame i and j is parameterized as a global rotation $R_{ij}$, a global translation direction $T_{ij}$, and a rotation angle of a given feature point along the implied curves of the translation direction, $\{\theta_{ij}^k\}_{k=1\ldots n}$. $R_{ij}$, $T_{ij}$ and $\theta_{ij}^k$ can be estimated by minimizing the following energy function:

$$E_{ij} = \sum_{k=1}^{n} \rho\left(\|R(\theta_{ij}^k, Tij)R_{ij}p_i^k - p_j^k\|_2^2\right)$$

where $\rho$ is the Huber loss to make the optimization more robust to outliers. Compared with the 5-point algorithm, the above-described technique is less sensitive to calibration parameters and considers all points simultaneously, which is useful especially when there are tracking errors.

Re-Cinematography

Once the input camera path has been estimated from the motion, a re-cinematography energy optimization can be defined, which consists of two terms:

$$E(\omega) = E_p(\omega) + E_s(\omega, p)$$

where $E_p$ is an energy function that captures art direction constraints imposed by the editor and $E_s$ is a function that penalizes the smoothness of the output feature trajectories. $\omega$ is a warping transform of the original input spherical video. A rotation and translation warping model is used to warp the input video so that the feature trajectories and camera direction are reasonably stable.

As noted above, camera motion may be translational or rotational with respect to a fixed reference frame. In the presence of translation in a 3D image, the original image frame is warped in a non-uniform way. This is achieved by drawing a virtual mesh on the unit sphere onto which the 3D image is projected, warping the mesh vertices independently, and then re-rendering the sphere and 3D image using the warped mesh. This allows for correction considering that, due to perspective, objects closer to the camera appear to move a greater distance with respect to the image frame than objects farther from the camera.

Generally, an example of a warping model, in accordance with an embodiment, is based on driving a per-vertex warp based on a set of sparse feature constraints. To obtain the feature constraints, each feature point is rotated by the rotation-only warp generated in the re-cinematography optimization described above. A second order Bezier curve is then fitted to each rotated feature track, which has been shown to guarantee first and second order smoothness. Next, point correspondences between the unwarped frame and the warped frame are collected for each frame. Based on these point correspondences, an input image is re-rendered as if the image was captured by a camera physically located on a well-directed and smooth 3D camera path. For example, a 3D rotation and a translation direction are estimated to obtain the point correspondences. The translation induced motion can be represented by a feature dependent axis and an angle that minimizes the energy for the point correspondence. The angle is obtained by projecting the warped point onto a plane and normalizing the projection of the point. Having obtained the rotation and translation between the unwarped frame and the warped frame, and the angle for each feature in the frame, the transformation from a set of feature points to a set of warped mesh vertices is represented by the minimized energy for all vertices parameterized on the angle.

Art Direction Constraints

Artistic direction constraints can be used in a number of ways. For example, art direction constraints can be used to specify salient features in the video that the editor would like the viewer to see. The art direction constraints can be added by the editor either by clicking directly on the VR projection, or by guided viewing, where the editor watches the video in a VR headset, and the editor's viewing directions are recorded and used for constraints. The editor's head motion is recorded during the playback of a video in a VR headset. The trajectory of the head motion is then sampled at all key frames and used to specify the desired viewing direction over the course of the video. Alternately, the editor may choose to specify a point or region that should not be seen, for example indicating content that is uninteresting, or may contain elements that do not belong in the scene, such as the camera crew, or stitching seams.

To achieve these interactions, two types of constraints are defined: positive look-at constraints and negative look-at constraints. Each positive look-at constraint is represented as a positive look-at point p on the sphere, where the goal is to rotate the video frame by a rotation matrix $R(\omega)$ to make the look-at point as close to the true north direction as possible. In other words, $R(\omega)$ minimizes the distance between p and the front vector $f=[0, 0, 1]^T$, which can be represented by the following energy:

$$E_+(\omega) = \arg\min_{\omega} \|R(\omega)p - f\|_2^2$$

Similarly, each negative look-at constraint is represented as a negative look-at point n on the sphere that we want to avid appearing in front of the viewer. In other words, a rotation matrix $R(\omega)$ is found that makes the negative constraint point appear outside of the user's field of view. Maximizing the distance to the front vector f is equivalent to minimizing the distance to the back vector $f=[0, 0, 1]^T$, which can be represented as:

$$E_-(\omega) = \arg\min_{\omega} \|R(\omega)n - b\|_2^2$$

In some embodiments, the negative constraint is placed outside a specific common viewing range, rather than directly behind the viewer, using a loss function $$\rho(x) = \alpha e^{-\frac{\beta}{x}},$$

which reduces the strength of the constraint as it moves farther behind the viewer. In some embodiments, $\alpha=3200$ and $\beta=26.73$, which means that once the negative point is out of the visible region (approximately 90° from the front) the penalty is near zero.

In either case, regions can be specified instead of single points, in which case points are uniformly sampled inside of a polygon specified by the user. Thus, for a set P of positive constraints and a set N of negative constraints, the art direction term can be defined as:

$$E_p = \sum_{i \in P} \|R(\omega)p_i - f\|_2^2 + \sum_{j \in N} \rho \|R(\omega)n_j - b\|_2^2$$

Smoothness Constraints

From the motion estimation, the relative rotation $R_{ij}$ between neighboring pairs of key frames is calculated. The rotations of each neighboring pair of key frames are chained together to obtain the rotation of each key frame aligned in a global coordinate frame, for example, the coordinate frame of the first key frame, as follows:

$$R_i = \prod_{j=1}^{i-1} R_{j,j+1}$$

For all remaining frames between each pair of neighboring key frames, the rotation of the respective frames relative to the key frames is estimated as follows:

$$R(\theta_{ij}) = \arg\min_{\theta_{ij}} \sum \|R(\theta_{ij})v_i^k - v_j^k\|_2^2$$

The global rotation of an inner frame $R_j$ is computed as:

$$R_j = R_{ij} R_i$$

In some embodiments, motion is estimated using rotation without translation between inner key frames for better efficiency than where both rotation and translation are used. A rotation model is fitted on the remaining features by solving the above equation for $R_j$ in a least square sense.

Given the rotation in a globally consistent coordinate for all frames in the video, a smoothness constraint is defined as a combination of a first order smoothness term, which represents the velocity of motion, and a second order smoothness term, which represents the acceleration of motion, as follows:

$$E_s(\omega,\theta) = E_{s1}(\omega,\theta) + E_{s2}(\omega,\theta)$$

where, $$E_{s1}(\omega,\theta) = \Sigma d(R(\omega_{i+1}\theta_{i+1}), R(\omega_i\theta_i))$$

is the first order term, and where, $$E_{s2}(\omega,\theta) = \Sigma d(R(\omega_{i+2}\theta_{i+2})R^T(\omega_{i+1}\theta_{i+1})R(\omega_{i+1}\theta_{i+1})R^T(\omega_i\theta_i))$$

where d is the difference between the quaternions of the corresponding rotation matrices.

Optimization

Since both the art direction and smoothness terms are non-convex, the joint energy function can be optimized in multiple stages to improve convergence time. First, the art direction term is optimized independently from smoothness, which gives an initial $\omega'$ for all keyframes. Then, $\omega'$ is fixed for keyframes, and the smoothness term is minimized for all frames, yielding $\omega''$. Next, the cinematography and smoothness terms are optimized together using $\omega''$ as initialization to compute the final result.

Some axes of rotation can be confusing for the viewer. In particular, camera movement in the roll axis is uncommon in many videos, and can be confusing. Therefore, in an embodiment, the roll axis is fixed in ω by default to allow for rotation only in the pitch and yaw of the camera, unless otherwise specified by the user (for example, rotation on the roll axis may be enabled).

3D Spherical Warping

Global rotation-only warps for ω have the advantage of being fast to compute (due to limited degrees of freedom), and are guaranteed to not introduce any local distortion into the video. However, camera shake often contains a significant translation component to it, which requires local warping to compensate for parallax effects. The parallax effect combined with other effects, such as rolling shutter, inaccurate camera calibration, and stitching artifacts, means that a smother trajectory can be found by modeling translation directly and computing local deformations of the video on the sphere. Based on the 3D translation motion estimation, co can be defined for local deformations. In particular, mesh-based warping is extended to the sphere, which has more degrees of freedom and the ability to correct for local deformation.

Another smoothness goal includes stabilizing the video by minimizing the first order smoothness and second order smoothness of feature trajectories. For instance, a Bezier curve is fitted on each feature track as its smoothed version, and then the mesh warping is estimated on a sphere that maps features to these smoothed ones. First, the rotation $R_{ij}$, translation $T_{ij}$, and $\theta_{ij}^k$ are estimated from each feature to a smoothed position of the feature. Then, to compute the transformation of each mesh vortex in the corresponding spherical mesh warp, a one dimensional minimization is solved on the translation angle $\theta$ to ensure that the warp is geometrically regularized, as follows:

$$\varphi = \arg\min \Sigma\|\theta_k - \Sigma w_n \varphi_n\|_2^2 + \Sigma\|\varphi_i - \varphi_j\|_2^2$$

where $\varphi$ are the translation angle for vertex, $\varphi_i$ and $\varphi_j$ are neighboring vertices on a sphere, $\varphi_n$ are the four vertices that cover a feature k on an equirectangular image, and $\omega_n$ is the corresponding bilinear interpolation weight for a vertex.

Computing Device

Figure 4:
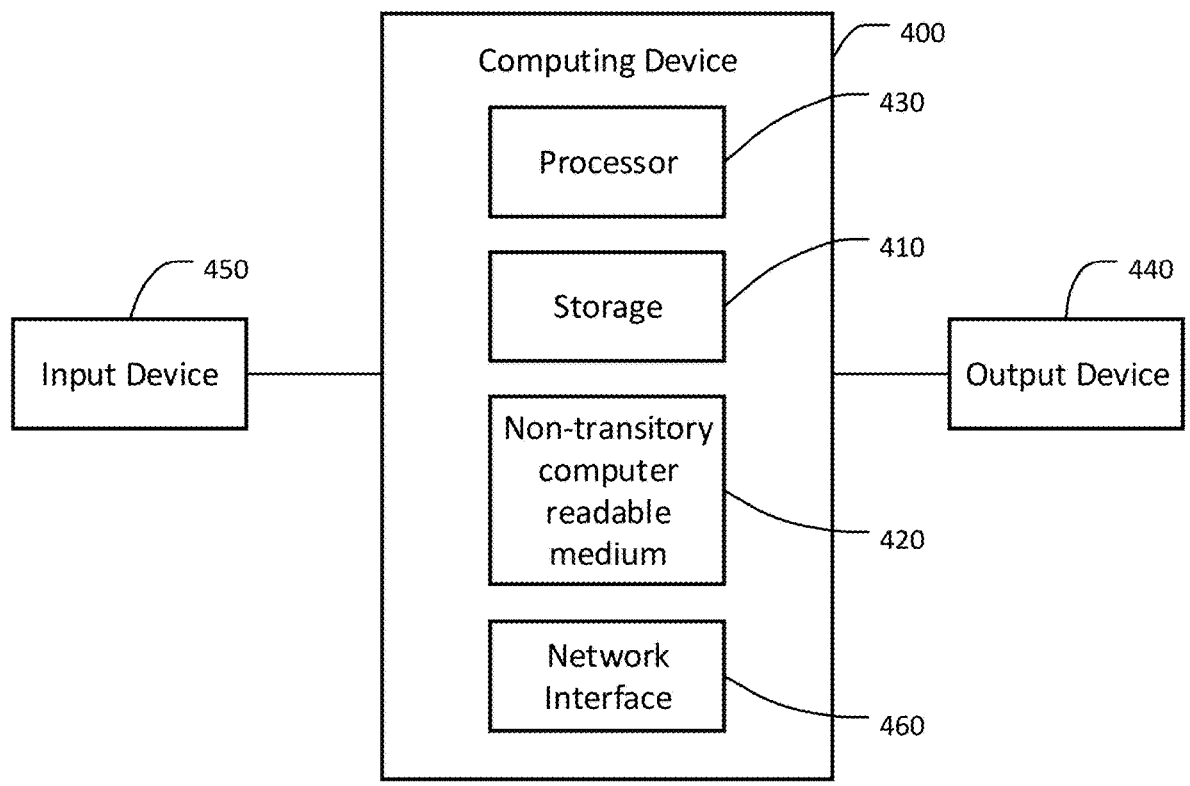
FIG. 4 is a block diagram representing an example computing device that may be used to perform any of the techniques as variously described in this disclosure.

FIG. 4 is a block diagram representing an example computing device 400 that may be used to perform any of the techniques as variously described in this disclosure. For example, the system 100 of FIG. 1, or any portions thereof, and the methodologies of FIG. 2, or any portions thereof, may be implemented in the computing device 400. The computing device 400 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), VR device or VR component (e.g., headset, hand glove, camera, treadmill, etc.) or other form of computing or telecommunications device that is capable of communication and that has sufficient processor power and memory capacity to perform the operations described in this disclosure. A distributed computational system may be provided including a plurality of such computing devices.

The computing device 400 includes one or more storage devices 410 or non-transitory computer-readable media 420 having encoded thereon one or more computer-executable instructions or software for implementing techniques as variously described in this disclosure. The storage devices 410 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 410 may include other types of memory as well, or combinations thereof. The storage device 410 may be provided on the computing device 400 or provided separately or remotely from the computing device 400. The non-transitory computer-readable media 420 may include, but are not limited to, one or more types of hardware memory, non-transitory tangible media (for example, one or more magnetic storage disks, one or more optical disks, one or more USB flash drives), and the like. The non-transitory computer-readable media 420 included in the computing device 400 may store computer-readable and computer-executable instructions or software for implementing various embodiments. The computer-readable media 420 may be provided on the computing device 400 or provided separately or remotely from the computing device 400.

The computing device 400 also includes at least one processor 430 for executing computer-readable and computer-executable instructions or software stored in the storage device 410 or non-transitory computer-readable media 420 and other programs for controlling system hardware. Virtualization may be employed in the computing device 400 so that infrastructure and resources in the computing device 400 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 400 through an output device 440, such as a screen or monitor, which may display one or more user interfaces provided in accordance with some embodiments. The output device 440 may also display other aspects, elements or information or data associated with some embodiments. The computing device 400 may include other I/O devices 450 for receiving input from a user, for example, a keyboard, a joystick, a game controller, a pointing device (e.g., a mouse, a user's finger interfacing directly with a touch-sensitive display device, etc.), or any suitable user interface, including a VR headset. The computing device 400 may include other suitable conventional I/O peripherals. The computing device 400 includes or is operatively coupled to various suitable devices for performing one or more of the aspects as variously described in this disclosure.

The computing device 400 may run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system, such as the video processing application 130, the feature tracking module 140, the motion estimating module 142, the re-cinematography module 144, the key frame interpolation module 146, the GUI 150, or any combination of these, is implemented in software, such as a set of instructions (e.g., HTML, XML, C, C++, object-oriented C, JavaScript®, Java®, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 400, may be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment provides a computer-implemented method of digitally modifying a video including receiving a plurality of digital video frames recorded by a camera. Each of the digital video frames has a spherical field of view (360 degrees or less) and a viewing angle associated with field of view. The viewing angle is with respect to a fixed reference frame. The method further includes calculating a motion of the camera relative to the fixed reference frame across at least some of the digital video frames, and reorienting, during post-processing of the digital video frames, the viewing angle associated with each digital video frame based at least in part on the calculated motion of the camera and at least one constraint to produce a digitally modified video such the viewing angle associated with at least one of the reoriented digital video frames is different than the viewing angle associated with the same digital video frame before reorientation. In some cases, the method includes selecting at least two key frames from the plurality of digital video frames, wherein the calculating of the motion of the camera is performed across the at least two key frames. In some cases, the method includes calculating a trajectory of at least one feature across the at least two key frames relative to the fixed reference frame, wherein the calculating of the motion of the camera is based at least in part on the calculated trajectory of the at least one feature. In some such cases, the method includes warping and rotating at least one of the key frames using a mesh-based spherical rotation and translation warping model. In some such cases, the calculation of the motion of the camera includes calculating a rotation component of a feature point in the at least one warped key frame with respect to an axis of the fixed reference frame, a translation component of the feature point in the at least one warped key frame with respect to the axis of the fixed reference frame, or both. In some cases, the constraint includes a user-specified viewing angle constraint, a motion stabilization smoothness constraint, or both. The user-specified viewing angle constraint includes a desired viewing angle associated with at least one of the reoriented digital video frames that causes the viewing angle associated with the respective reoriented digital video frame to be different than the viewing angle associated with the same digital video frame before reorientation. In some cases, the method includes causing display of the reoriented digital video frames via a display device. Another example embodiment provides a non-transitory computer program product having instructions encoded thereon that when executed by one or more computer processors cause the one or more computer processors to perform a process such as set forth in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method of digitally modifying a video, the method comprising:
receiving a plurality of digital video frames recorded by a camera, each of the digital video frames having a spherical field of view and a viewing angle associated therewith, the viewing angle being with respect to a fixed reference frame;
calculating, by a computer processor, a motion of the camera relative to the fixed reference frame across at least some of the digital video frames; and
reorienting, by the computer processor during post-processing of the digital video frames, the viewing angle associated with each digital video frame based at least in part on the calculated motion of the camera and at least one constraint to produce a digitally modified video such the viewing angle associated with at least one of the reoriented digital video frames is different than the viewing angle associated with the same digital video frame before reorientation,
wherein the at least one constraint includes a user-specified positive look-at point in the respective digital video frame and a user-specified negative look-at point in the respective digital video frame, wherein the viewing angle associated with at least one of the reoriented digital video frames is based on an energy function that (i) minimizes a first distance between the positive look-at point and a vector representing the viewing angle, and (ii) maximizes a second distance between the negative look-at point and the vector representing the viewing angle.

2. The method of claim 1, further comprising selecting at least two key frames from the plurality of digital video frames, wherein the calculating of the motion of the camera is performed across the at least two key frames.

3. The method of claim 2, further comprising calculating, by the computer processor, a trajectory of at least one feature across the at least two key frames relative to the fixed reference frame, wherein the calculating of the motion of the camera is based at least in part on the calculated trajectory of the at least one feature.

4. The method of claim 2, further comprising warping and rotating, by the computer processor, at least one of the key frames using a mesh-based spherical rotation and translation warping model.

5. The method of claim 4, wherein the calculation of the motion of the camera includes calculating at least one of a rotation component of a feature point in the at least one warped key frame with respect to an axis of the fixed reference frame and a translation component of the feature point in the at least one warped key frame with respect to the axis of the fixed reference frame.

6. The method of claim 1, wherein the at least one constraint includes a motion stabilization smoothness constraint including a rate at which the viewing angle associated with the reoriented digital video frames is changed over time.

7. The method of claim 1, further comprising causing, by the computer processor, display of the reoriented digital video frames via a display device.

8. A non-transitory computer readable medium having instructions encoded thereon that when executed by one or more computer processors cause the one or more computer processors to perform a process of digitally modifying a video, the process comprising:
    receiving a plurality of digital video frames recorded by a camera, each of the digital video frames having a spherical field of view and a viewing angle associated therewith, the viewing angle being with respect to a fixed reference frame;
    calculating a motion of the camera relative to the fixed reference frame across at least some of the digital video frames; and
    reorienting, during post-processing of the digital video frames, the viewing angle associated with each digital video frame based at least in part on the calculated motion of the camera and at least one constraint to produce a digitally modified video such the viewing angle associated with at least one of the reoriented digital video frames is different than the viewing angle associated with the same digital video frame before reorientation,
    wherein the at least one constraint includes a user-specified positive look-at point in the respective digital video frame and a user-specified negative look-at point in the respective digital video frame, wherein the viewing angle associated with at least one of the reoriented digital video frames is based on an energy function that (i) minimizes a first distance between the positive look-at point and a vector representing the viewing angle, and (ii) maximizes a second distance between the negative look-at point and the vector representing the viewing angle.

9. The non-transitory computer readable medium of claim 8, the process further comprising selecting at least two key frames from the plurality of digital video frames, wherein the calculating of the motion of the camera is performed across the at least two key frames.

10. The non-transitory computer readable medium of claim 9, the process further comprising calculating, by the one or more computer processors, a trajectory of at least one feature across the at least two key frames relative to the fixed reference frame, wherein the calculating of the motion of the camera is based at least in part on the calculated trajectory of the at least one feature.

11. The non-transitory computer readable medium of claim 9, further comprising warping and rotating at least one of the key frames using a mesh-based spherical rotation and translation warping model.

12. The non-transitory computer readable medium of claim 11, wherein the calculation of the motion of the camera includes calculating at least one of a rotation component of a feature point in the at least one warped key frame with respect to an axis of the fixed reference frame and a translation component of the feature point in the at least one warped key frame with respect to the axis of the fixed reference frame.

13. The non-transitory computer readable medium of claim 8, wherein the at least one constraint includes a motion stabilization smoothness constraint including a rate at which the viewing angle associated with the reoriented digital video frames is changed over time.

14. The non-transitory computer readable medium of claim 8, the process further comprising causing, by the computer processor, display of the reoriented digital video frames via a display device.

15. A system for digitally modifying a video, the system comprising:
    a storage; and
    a processor operatively coupled to the storage, the processor configured to execute instructions stored in the storage that when executed cause the processor to carry out a process including
        receiving a plurality of digital video frames recorded by a camera, each of the digital video frames having a spherical field of view and a viewing angle associated therewith, the viewing angle being with respect to a fixed reference frame;
        step for calculating a motion of the camera relative to the fixed reference frame across at least some of the digital video frames; and
        step for reorienting, during post-processing of the digital video frames, the viewing angle associated with each digital video frame based at least in part on the calculated motion of the camera and at least one constraint to produce a digitally modified video such the viewing angle associated with at least one of the reoriented digital video frames is different than the viewing angle associated with the same digital video frame before reorientation,
        wherein the at least one constraint includes a user-specified positive look-at point in the respective digital video frame and a user-specified negative look-at point in the respective digital video frame, wherein the viewing angle associated with at least one of the reoriented digital video frames is based on an energy function that (i) minimizes a first distance between the positive look-at point and a vector representing the viewing angle, and (ii) maximizes a second distance between the negative look-at point and the vector representing the viewing angle.

16. The system of claim 15, the process further comprising selecting at least two key frames from the plurality of digital video frames, wherein the step for calculating of the motion of the camera is performed across the at least two key frames.

17. The system of claim 16, the process further comprising a step for calculating a trajectory of at least one feature across the at least two key frames relative to the fixed reference frame, wherein the step for calculating of the motion of the camera is based at least in part on the calculated trajectory of the at least one feature.

18. The system of claim 16, wherein the process further comprises warping and rotating at least one of the key frames using a mesh-based spherical rotation and translation warping model.

19. The system of claim 18, wherein the step for calculating the motion of the camera includes calculating at least one of a rotation component of a feature point in the at least one warped key frame with respect to an axis of the fixed reference frame and a translation component of the feature point in the at least one warped key frame with respect to the axis of the fixed reference frame.

20. The system of claim 15, wherein the at least one constraint includes a motion stabilization smoothness constraint including a rate at which the viewing angle associated with the reoriented digital video frames is changed over time.

\* \* \* \* \*